United States Patent
Volf et al.

(10) Patent No.: US 7,275,861 B2
(45) Date of Patent: Oct. 2, 2007

(54) CALIBRATION WAFER AND METHOD OF CALIBRATING IN SITU TEMPERATURES

(75) Inventors: Boris Volf, Plainsboro, NJ (US); Mikhail Belousov, Plainsboro, NJ (US); Alexander Gurary, Bridgewater, NJ (US)

(73) Assignee: Veeco Instruments Inc., Woodbury, NY (US)

(*) Notice: Subject to any disclaimer, the term of this patent is extended or adjusted under 35 U.S.C. 154(b) by 19 days.

(21) Appl. No.: 11/046,741

(22) Filed: Jan. 31, 2005

(65) Prior Publication Data

US 2006/0171442 A1     Aug. 3, 2006

(51) Int. Cl.
*G01K 15/00* (2006.01)
*G01J 5/00* (2006.01)

(52) U.S. Cl. .......................... 374/1; 374/121
(58) Field of Classification Search ............. 374/1, 374/121

See application file for complete search history.

(56) References Cited

U.S. PATENT DOCUMENTS

| | | |
|---|---|---|
| 4,627,740 A | 12/1986 | Jerde et al. |
| 4,761,539 A | 8/1988 | Carmean |
| 4,956,538 A | 9/1990 | Moslehi |
| 4,960,569 A | 10/1990 | Fovell et al. |
| 4,984,902 A | 1/1991 | Crowley et al. |
| 5,092,679 A | 3/1992 | Brotz |
| 5,102,231 A | 4/1992 | Loewenstein et al. |
| 5,156,461 A | 10/1992 | Moslehi et al. |
| 5,258,602 A | 11/1993 | Naselli et al. |
| 5,265,957 A | 11/1993 | Moslehi et al. |
| 5,326,170 A | 7/1994 | Moslehi et al. |
| 5,490,728 A | 2/1996 | Schietinger et al. |
| 5,553,939 A | 9/1996 | Dilhac et al. |
| 5,762,419 A | 6/1998 | Yam |

(Continued)

FOREIGN PATENT DOCUMENTS

GB     2 082 767     3/1982

(Continued)

OTHER PUBLICATIONS

International Search Report and Written Opinion for PCT/US2006/03331, entitled "Calibration Wafer and Method of Calibrating In Situ Temperatures", dated May 26, 2006.

(Continued)

*Primary Examiner*—Diego Gutierrez
*Assistant Examiner*—Mirellys Jagan
(74) *Attorney, Agent, or Firm*—Lerner, David, Littenberg, Krumholz & Mentlik, LLP

(57) ABSTRACT

A system and method for calibrating a pyrometer used in temperature detection in a chemical vapor deposition system is provided. A calibration wafer with a reference region including a metal such as Al or Ag for forming a eutectic, and an exposed non-reference region without such a metal, are provided. Reflectivity measurements are taken from the reference region, and temperature measurements are taken from the non-reference region, over a range of temperatures including a known melting point for the metal eutectic. The pyrometer is calibrated based on the correlation of the known eutectic melting point with the change in reflectivity data obtained in the reference region, in light of the temperature data obtained from the non-reference region.

8 Claims, 7 Drawing Sheets

U.S. PATENT DOCUMENTS

| | | |
|---|---|---|
| 5,769,540 A | 6/1998 | Schietinger et al. |
| 5,902,504 A | 5/1999 | Merchant et al. |
| 6,004,029 A | 12/1999 | Moslehi et al. |
| 6,016,190 A | 1/2000 | Glazman |
| 6,106,148 A | 8/2000 | Moslehi et al. |
| 6,126,744 A | 10/2000 | Hawkins et al. |
| 6,128,084 A | 10/2000 | Nanbu et al. |
| 6,132,081 A | 10/2000 | Han |
| 6,169,271 B1 | 1/2001 | Savas et al. |
| 6,183,127 B1 | 2/2001 | Hebb et al. |
| 6,197,601 B1 | 3/2001 | Hirashita |
| 6,200,023 B1 | 3/2001 | Tay et al. |
| 6,283,630 B1 | 9/2001 | Yazawa |
| 6,293,696 B1 | 9/2001 | Guardada |
| 6,299,346 B1 | 10/2001 | Ish-Shalom et al. |
| 6,310,327 B1 | 10/2001 | Moore et al. |
| 6,345,909 B1 | 2/2002 | Yam |
| 6,398,405 B1 | 6/2002 | Yamada |
| 6,561,694 B1 | 5/2003 | Lerch et al. |
| 6,635,501 B1 | 10/2003 | Rowland |
| 6,641,299 B2 | 11/2003 | Sasajima et al. |
| 6,646,235 B2 | 11/2003 | Chen et al. |
| 6,647,350 B1 | 11/2003 | Palfenier et al. |
| 6,666,577 B2 | 12/2003 | Shibata et al. |
| 6,682,216 B1 | 1/2004 | Small IV et al. |
| 6,703,592 B2 | 3/2004 | Van Bilsen |

FOREIGN PATENT DOCUMENTS

| | | |
|---|---|---|
| JP | 60 253939 | 12/1985 |
| WO | WO-94/00744 | 1/1994 |

OTHER PUBLICATIONS

Dilhac, J.M., et al, "GE Thin-Film Melting Point Detection for Optical Pyrometer Calibration in a Rapid Thermal Processor" Review of Scientific Instruments, AIP, Melville, NY, vol. 63, No. 1, Jan. 1992, pp. 188-190.

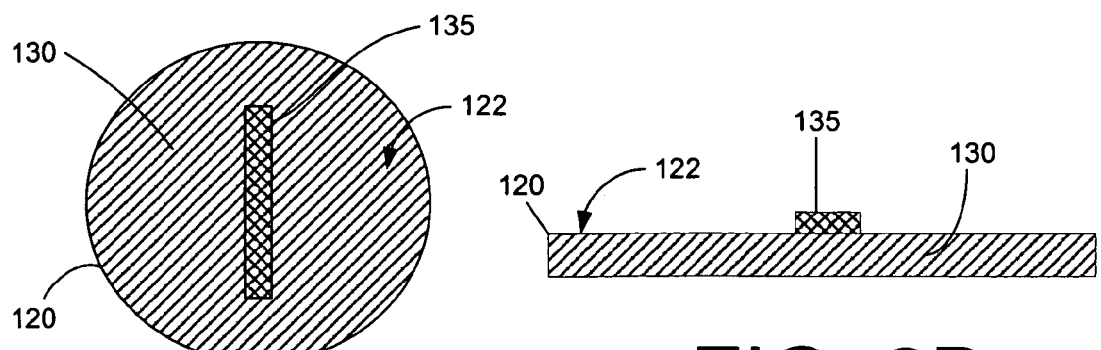
FIG. 2A
FIG. 2B
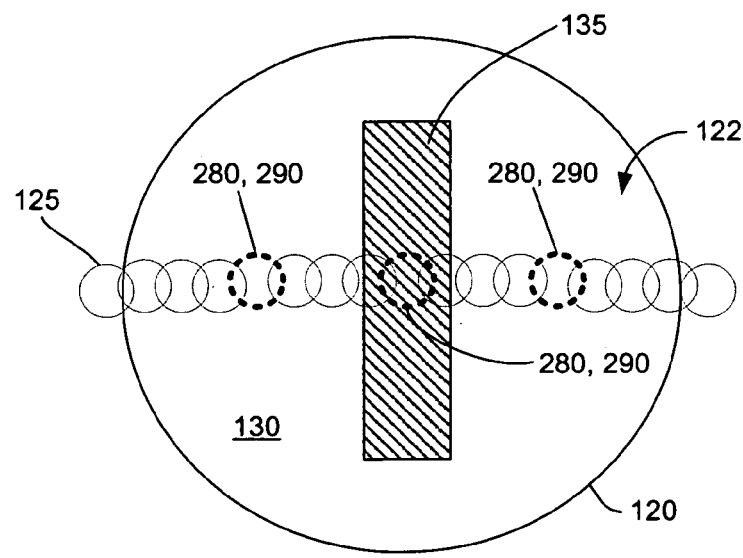
FIG. 3

CALIBRATION WAFER AND METHOD OF CALIBRATING IN SITU TEMPERATURES

BACKGROUND OF THE INVENTION

The present application relates to systems and methods for pyrometry calibration, and more particularly relates to systems and methods for calibrating pyrometers for use in chemical vapor deposition systems using reflectivity and temperature measurements obtained from a eutectic calibration target.

Accurate temperature readings are essential for many industrial processes such as, for example, epitaxial growth of layers on wafers in susceptor-based chemical vapor deposition ("CVD") systems. Uniform deposition in such systems is dependent on even temperature distribution along with other variables such as, for example, reactor pressure, reactant gas ratios, reactant gas flow rates, and the like. Thus, accurate in situ measurements of CVD reactor temperature are desirable. These temperature measurements preferably should be accurate enough to ensure uniform deposition of layers of material on wafers to be processed.

To measure temperature in CVD systems, a high temperature non-contact thermometry device such as a pyrometer may be employed. A pyrometer detects temperature by measurement of emissions from the internal surfaces of a CVD reactor.

To ensure the accuracy of pyrometer readings, though, the pyrometer should be properly calibrated to a temperature scale. Calibration devices can employ bonded thermocouples, emissivity detectors, and/or can employ these techniques in combination with calibration wafers that exhibit known properties at particular temperatures. In some pyrometer-based temperature measurement systems, calibration of the pyrometer sometimes requires that the pyrometry system be taken off-line - or in some circumstances even off-site during recalibration. Such off-site time or off-line time can result in decreased efficiency through lost processing time.

Some calibration systems employ a eutectic calibration wafer with a layer of material that melts into a eutectic at a known temperature. By measuring the temperature of the wafer using the pyrometer, and observing the layer to determine when melting occurs. These systems can be used to calibrate the pyrometer in place on the CVD apparatus, and can approximate the temperature of the melting and correlate the melting point of the eutectic to the measurements obtained by the pyrometer. For example, melting can be observed by monitoring reflectivity of the surface to detect the change in reflectance due to melting.

A problem with these systems as they currently exist is that the pyrometer is attempting to determine temperature readings from surfaces that typically have low emissivity because of their metal contents, making temperature difficult to read accurately.

Accuracy may also be reduced because at the point of melting of the eutectic wafer, other changes in phase, emissivity, and reflectivity may occur that could interfere with accurate temperature measurements and calibration. In addition, many eutectic wafers require a complex, many-layered design, raising quality control issues and making the wafers more expensive to produce.

What is needed is a pyrometer calibration system for a heated environment that solves these problems while providing accurate, simple, efficient and non-interruptive calibration of a pyrometer.

SUMMARY OF THE INVENTION

In one aspect of the invention, a system for calibrating a pyrometer is disclosed, comprising: an adjustably heated environment including a wafer carrier; a calibration semiconductor wafer with a first surface, the first surface including a eutectic-forming metal stripe with a known melting point and at least one exposed semiconductor region, the calibration semiconductor wafer placed in the wafer carrier in the adjustably heated environment; a reflectometer optically coupled to the eutectic stripe of the calibration wafer by way of a reflectometer field of view, the reflectometer connected to at least one light source and at least one photosensor, the reflectometer obtaining first data related to the known melting point of the contiguous eutectic stripe through the at least one light source and at least one photosensor; a pyrometer optically coupled to the at least one exposed semiconductor region of the calibration wafer by way of a pyrometer field of view, the pyrometer including at least one sensor, the pyrometer obtaining second data related to the temperature of the calibration semiconductor wafer through the at least one sensor; and, a processor electrically coupled to the pyrometer and the reflectometer for calibrating the pyrometer based on the first data related to the melting point of the contiguous eutectic stripe and the second data related to the temperature of the calibration semiconductor wafer in the adjustably heated environment.

In another embodiment of the invention, a system for calibrating a temperature measurement device is disclosed, comprising: a calibration target including a target material defining a first surface including a first region and a second region; a contiguous layer of a metal overlying the first region of the first surface and contiguous with the target material, the metal having higher reflectivity than the target material, the metal being adapted to form a melt phase with the target material at a known temperature and change reflectivity upon formation of the melt phase, the second region being devoid of the metal; an emitter adapted to direct radiant energy onto the first region so that the direct radiant energy will be reflected by the first region; and, a sensor unit including one or more sensors, the sensor unit being adapted to detect radiant energy reflected by the first region to obtain reflectivity data representing the reflectivity of the first region, the sensor unit also being adapted to detect radiant energy emitted by the second region to obtain temperature data representing the temperature of the target.

In one embodiment of the invention, a method for calibrating a pyrometer is disclosed, comprising: placing a calibration target wafer in optical communication with an optical head, the calibration target including a first surface with a first contiguous eutectic-forming region and a second exposed semiconductor region, the optical head including a pyrometer, a source of reflectivity data, and a processor; heating the calibration target wafer; obtaining the melting point of the eutectic region of the calibration target from the source of reflectivity data; obtaining temperature data for the calibration target wafer in the second exposed semiconductor region from the pyrometer; and, calibrating the pyrometer at the processor by employing the reflectivity data and the temperature data to determine the actual temperature of the calibration target wafer when the melting point of aid eutectic region occurs, and adjusting the pyrometer based on the actual temperature.

In one embodiment of the invention, the method further comprises the steps of: transmitting light from the optical head to the first surface of the calibration target wafer; receiving reflected light at the optical head from the calibration target wafer; separating modulated and unmodulated portions of the reflected light at the optical head; and, calculating temperature data at the pyrometer based on the modulated portion of the reflected light and calculating reflectivity data at the reflectometer based on the unmodulated portion of the reflected light.

In yet another embodiment, a calibration target wafer for use in calibrating a pyrometer is disclosed, comprising: a first surface of the wafer, the first surface including a eutectic-forming metal shape with a known melting point, the eutectic-forming metal shape centrally located along a diameter of the first surface of the wafer, the eutectic-forming metal shape capable of reflecting a light signal to represent the reflectivity of the eutectic-forming metal shape before, during and after melting of the shape; and, at least one exposed semiconductor region of the first surface, the at least one exposed semiconductor region of the first surface covering substantially all of the regions of the first surface not covered by the eutectic-forming metal shape.

BRIEF DESCRIPTION OF THE DRAWINGS

FIG. 2A is an overhead view of one embodiment of a calibration wafer of the present invention.

FIG. 2B is a cross sectional view of one embodiment of the calibration wafer of FIG. 2A.

FIG. 3 is an overhead view of the calibration of FIGS. 2A & 2B, during use in a method according to one embodiment of the invention.

DETAILED DESCRIPTION

Figure 1:
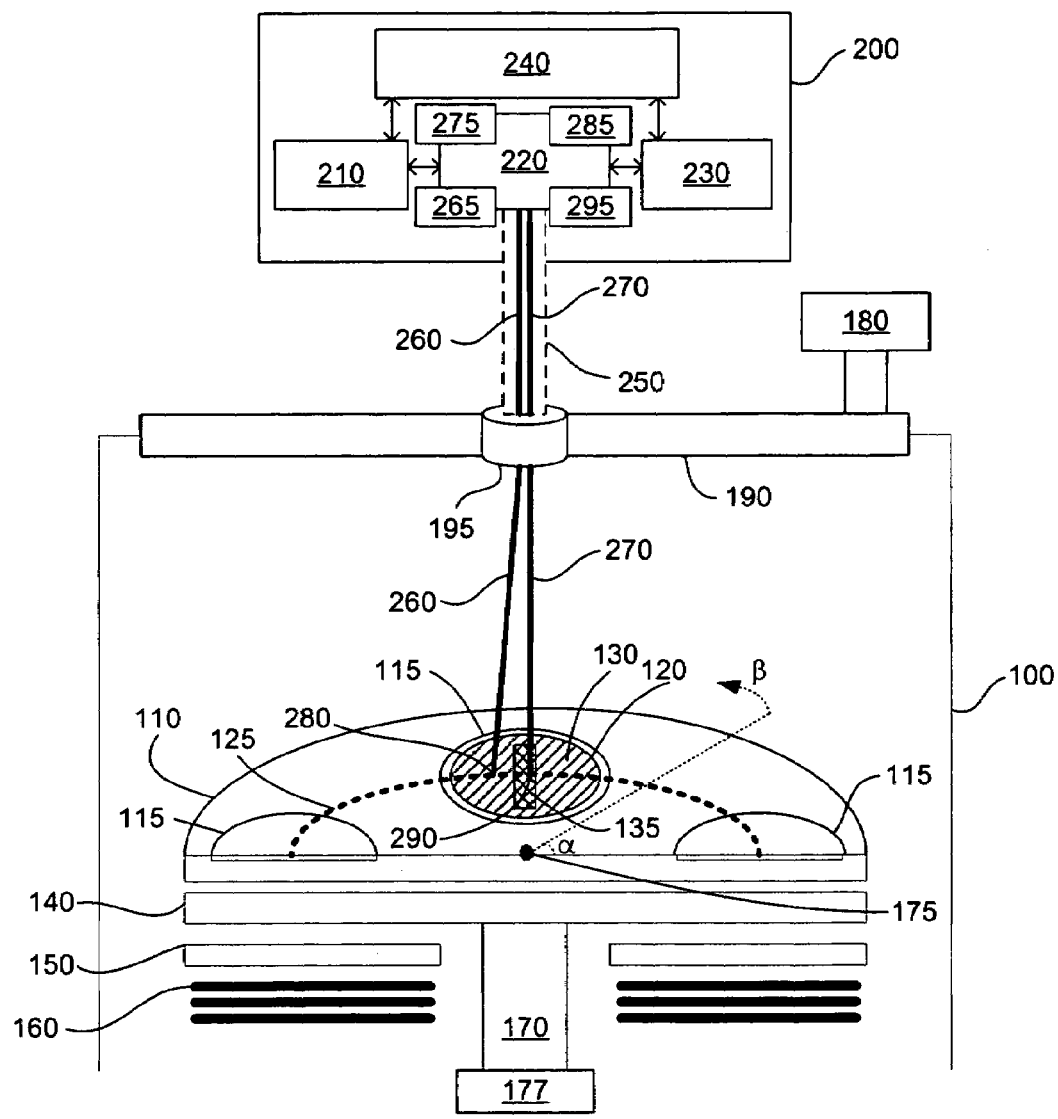
FIG. 1 is a simplified overview drawing of one embodiment of the pyrometry temperature calibration system of the present invention as used with a chemical vapor deposition reactor.

FIG. 1 shows one embodiment of the pyrometry temperature calibration system of the present invention, as used with a chemical vapor deposition reactor. A chemical vapor deposition reactor ("CVD reactor") 100 contains a wafer carrier 110 centrally located therein. The wafer carrier 110 includes a plurality of wafer compartments 115. A calibration target wafer 120 is placed in one of the wafer compartments 115 when pyrometer calibration is going to be performed. The other compartments 115 of the wafer carrier typically contain one or more wafer substrates (not shown) on which chemical vapor deposition processes are to be performed.

The calibration target 120 is seated in a wafer compartment 115 that is along optical calibration path 125. The calibration target wafer 120 includes a non-reference region 130 and a reference region 135 described in more detail in FIGS. 2A and 2B, below.

The wafer carrier 110 is advantageously seated on a susceptor 140 that is itself heated by a heating system adjacent thereto. In this embodiment, the heating system includes heating elements 150 and heat shields 160 disposed adjacently thereto that protect the remainder of the reactor environment from the heating elements 150. The susceptor rotates on a spindle 170 around a central point 175, thus rotating the wafer carrier and calibration wafer 120 (or ordinary wafers) at a predetermined rate β around a central axis of the reactor along a circular path. The position of the rotating susceptor at any time can be stated as the angle α relative to an arbitrary zero or resting rotational position. A rotary encoder 177 is connected to spindle 170, and provides data related to the angle α mainly by way of the reactor, susceptor, wafer carrier and associated combination that may be of the type sold by Veeco Instruments, Inc. under the Turbodisc® and GanZilla® trademarks. In this manner, various deposition processes can be performed in the CVD reactor 100. One such reactor is described in U.S. Pat. No. 6,197,121, entitled "CHEMICAL VAPOR DEPOSITION APPARATUS", issued Mar. 6, 2001, assigned to the assignee of the present application, and hereby incorporated by reference in its entirety. During deposition processing, one or more gases sources 180 deliver deposition gasses to the CVD reaction chamber 100 via a gas head 190, thus providing an adjustably heated environment for wafer processing.

The gas head 190 includes an optical viewport 195. One gas head with an optical viewport that can be used with the present invention is, for example, the FlowFlange chemical vapor deposition showerhead sold by Veeco Instruments, Inc. Also, the flow flange described in U.S. Prov. Pat. App. No. 60/598,172, entitled "FLOW FLANGE FOR CHEMICAL VAPOR DEPOSITIONR REACTORS", filed Aug. 2, 2004, assigned to the assignee of the present application, and hereby incorporated by reference in its entirety, may be used. The optical viewport 195 connects an optical head 200 used for temperature and other thermodynamic measurements in the system with the reactor 100, by way of an optical head light communication path 250 that optically communicates with the wafer carrier 110.

The optical head 200 includes a pyrometer 210, an optical control system 220, a reflectometer 230, and a central processing unit 240. The optical control system 220 is connected to the pyrometer 210 and reflectometer 230 and sends and receives light signals to and from the reactor via path 250.

The optical system 220 includes at least one photodetector 265, a signal filter 275, a signal modulator 285, and a light source 295 such as an LED or diode laser. In the embodiment depicted, these components are shared between pyrometer 210 and reflectometer 230. Signal modulator 285 provides a signal at a predetermined modulation frequency to light source 295 so that the light source will emit light amplitude-modulated at such frequency.

For example, source 295 may be arranged to provide infrared light at about 930 nm wavelength, amplitude-modulated at about 5.2 KHz. The at least one photodetector 265 may include a single photodetector such as a photodiode, or may include separate photodiodes associated with the pyrometer and with the reflectometer. The photodetector is sensitive only within a selected wavelength band, as, for example at about 930 nm. The output or outputs of the at least one photodetector 265 is or are connected to the input of filter 275. Filter 275 is arranged to separate signal components at the predetermined modulation frequency from other, lower-frequency components. Filter 275 may be a conventional analog electrical filter or, preferably, a digital filter coupled to the at least one photodetector by analog-to-digital conversion circuitry (not shown). The filter routes the components at the modulation frequency to reflectometer 230 and components at other frequencies, such as DC components, to pyrometer 210.

Pyrometer 210 is arranged to detect radiation emitted from a predetermined region 280 in the plane of wafer carrier 110, such region 280 being disposed in a fixed position relative to reactor 100. This region 280 is referred to herein as the "field of view" of the pyrometer.

Reflectometer 230 is arranged to direct the amplitude-modulated light from source 295 onto a predetermined region 290 in the plane of wafer carrier 110, and to measure the radiation reflected from such region, as by measuring the component of the signal from the at least one photodetector 265 at the modulation frequency, so as to derive a measure of the reflectivity, and hence the emissivity, of the surface disposed within region 290. This predetermined region 290 is also at a fixed position relative to the reactor 110, and is referred to herein as the field of view of the reflectometer.

Although the fields of view 280 and 290 are depicted separately from one another in FIG. 1, in practice these fields of view desirably are coincident with one another or concentric with one another. Both of these fields of view desirably are small, as, for example, circular regions of approximately 5 mm diameter. Pyrometer 210 desirably is arranged to provide a measured temperature value based on the magnitude of the radiation detected by the pyrometer itself and the emissivity of the surface as determined by reflectometer 230. These elements of the system may be provided in the form of a reflectometer/pyrometer assembly of the type sold under the designation RealTemp® Optical Head by Veeco Instruments, Inc., assignee of the present application.

The fields of view 280, 290 are disposed at a preselected radius from axis 175 so that as wafer carrier 110 and spindle 170 rotate about axis 175, these fields of view will sweep along a predetermined path 125 on the carrier surface. The radius is selected so that path 125 extends across the reference region 135 and non-reference region 130 of calibration target wafer 120.

Calibration target 120 (FIGS. 2A and 2B) desirably is in the form of a wafer having a first surface 122. Surface 122 includes a first or reference region 135 and a second or non-reference region 130. The wafer includes a material referred to herein as a target material, which may be a semiconductor such as silicon or a III-V semiconductor as, for example, gallium arsenide or gallium nitride. This material is exposed and hence forms the second or non-reference region 130 of surface 122. The target 120 further includes a metal overlying the target material, and contiguous with the target material, in the first or reference region 135 of surface 122. The metal in region 135 desirably is arranged to melt at a known melting temperature. Most preferably, the metal is adapted to melt by forming a molten eutectic phase with the target material at such predetermined temperature. For example, aluminum forms a molten eutectic with silicon at approximately 577° C., whereas silver forms a molten eutectic with silicon nitride at approximately 835° C. The metal desirably is present in a relatively thin layer as, for example, preferably between about 0.3 microns to about 3 microns thick, although the thickness is not limited to that range. In its unmelted state, the metal desirably has a higher reflectivity than the target material. The target may include additional underlying layers (not shown) remote from surface 122. The target may optionally be covered by a protective coating that does not interfere with the forming of a eutectic or the reflectivity and temperature measurements described herein, such as, for example, $SiO_2$.

Most preferably, first or reference region 135 is smaller than second or non-reference region 130, and the second region 130 extends on at least two sides of the first region. In the particular embodiment illustrated, the first or reference region 135 is in the form of a single elongated stripe. However, other configurations and shapes can be used. The target or wafer typically is in the form of a circular disk, although other shapes may be employed depending on the configuration of the wafer carrier.

As shown in FIG. 1, target 120 is positioned in a compartment 115 of the wafer carrier with the stripe-shaped first or reference region 135 extending generally radially with respect to axis 175.

In this embodiment, the wafer carrier (and calibration target placed thereon) rotates at a rate β relative to the field of views 280, 290. However, the movement of the wafer carrier need not be rotation, but may more generally be any periodic movement such as rotation, oscillation, reciprocal motion, and the like. Moreover, the field of views 280, 290 may move relative to the wafer carrier to same effect, via periodic motion of the optical head 220 or, more preferably, via use of a mirror system in the optical head 200 and/or optical viewport 195 to move the path of light between the optical head and the calibration path 125 at a periodic rate β.

In operation, as the wafer carrier rotates, the fields of view 280, 290 of the pyrometer and reflectometer sweep along path 125. As seen in FIG. 3, the path intercepts the reference region 135 and non-reference region 130 so that at certain angular positions α of the wafer carrier, the fields of view are aligned with the reference region 135, whereas at other angular positions α the fields of view are aligned with the non-reference region 130. The reflectometer 230 and pyrometer 210 (FIG. 1) thus obtain reflectivity data and temperature data for the reference region at certain angular positions, and obtain reflectivity data and temperature data for the non-reference region at other angular positions.

The optical head 200 further includes, or is connected to, a central processing unit 240 that serves to calculate, store, and provide output representative of temperatures and other information as determined by the pyrometer 210 and other systems in the optical head 200. The central processing unit 240 may be part of a computer (not shown) including standard input/output interfaces and devices, display screens, data storage mechanisms, communications and network devices, and the like.

While the spindle is rotating the wafer carrier through observation angles α at a regular rate β, the heating elements of the reactor heat the reactor, the wafer carrier and target 120 progressively, most preferably at a constant or nearly constant rate. During this period, the central processing unit 240 accumulates data based on repeated observations of the calibration target at the same rotational positions.

Figure 4A:
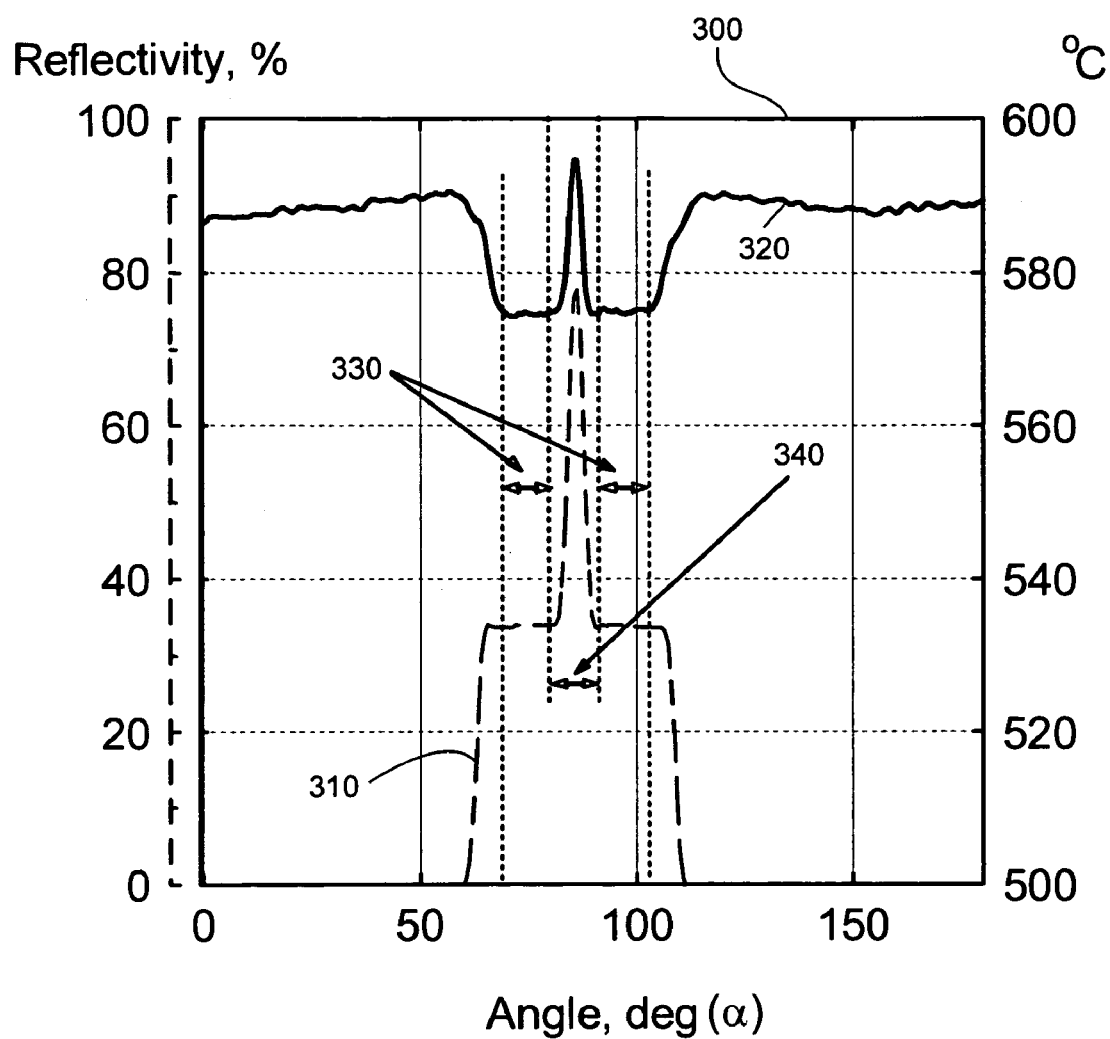
FIG. 4A is a graph of exemplary reflectivity and temperature measurement results from one embodiment of the pyrometry temperature calibration system of the present invention, taken from a calibration wafer prior to eutectic melting.

FIG. 4A provides a line graph of exemplary reflectivity and temperature measurement results relative to the angular position of the carrier prior to melting of the metal in the reference region 135. The graph 300 is an overlay of (1) reflectivity measurement in percentage of light reflected from the reference region 135 of the calibration target relative to observation angle α (measurements shown along broken line 310), and (2) temperature measurement in degrees Celsius relative to observation angle α (measurements shown along solid line 320).

The graph shows distinct plateaus for the non-reference regions of the calibration wafer for both reflectance and temperature, shown in graph segments 330. Similarly, a distinct peak of higher temperature and much higher reflectivity is visible for the reference regions (unmelted metal) of the calibration wafer, shown in graph segment 340. The regions outside of the plateaus, such as the returns at angles of 50 and 150 degrees, represent reflectivity and temperature data for the carrier surface, and are discounted. In such a manner, temperature and reflectance values for the non-reference region and reference region of the calibration wafer can be readily identified prior to melting of the eutectic in the reference region of the calibration wafer. Similarly, angular locations on the wafer carrier representing the non-reference region and reference regions of the calibration wafer can be obtained from these observations.

Figure 4B:
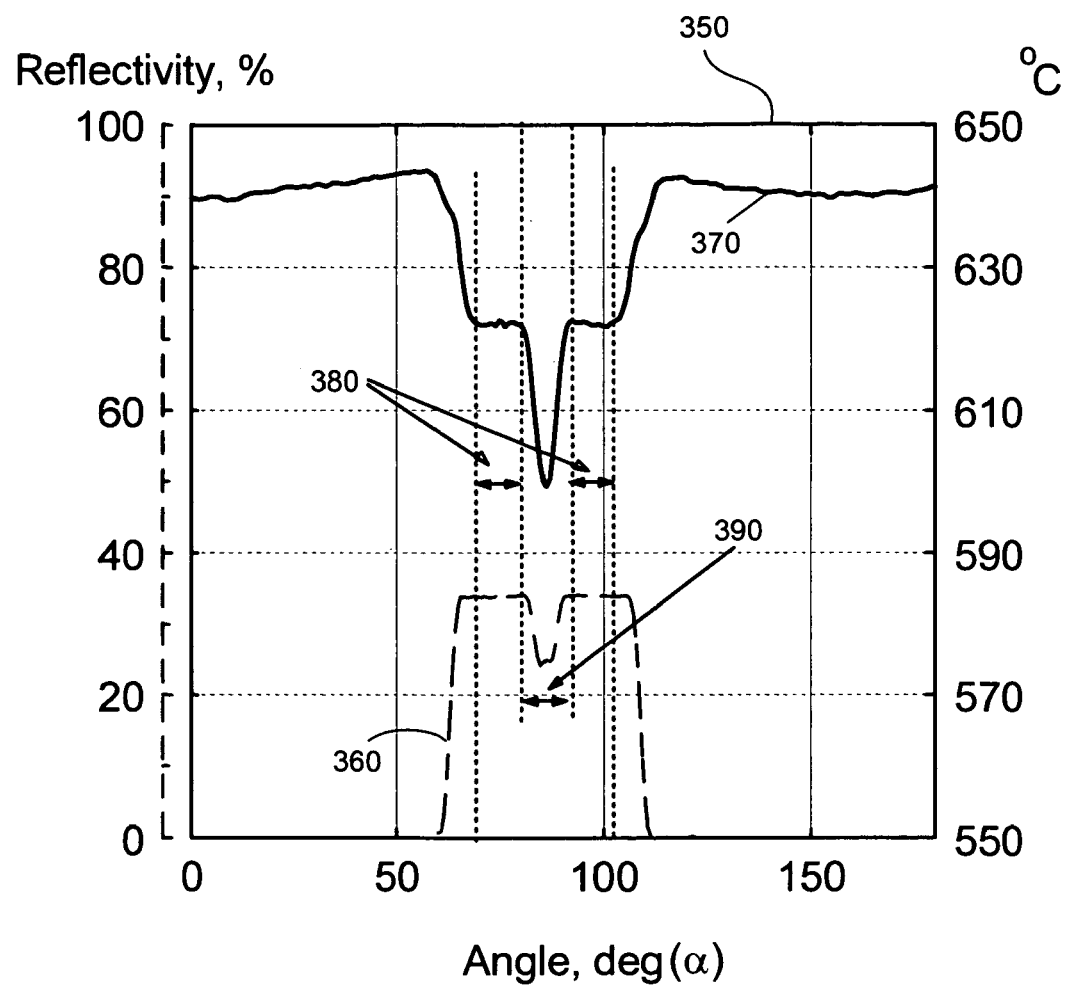
FIG. 4B is a graph similar to FIG. 4A but depicting measurements taken from a calibration wafer after eutectic melting.

FIG. 4B provides a graph of exemplary reflectivity and temperature measurement results relative to angular position of the carrier.

The graph 350, like the graph of FIG. 4A, is an overlay of (1) reflectivity measurement in percentage of light reflected from the reference region of the calibration wafer relative to observation angle α (shown along broken path 360), and (2) temperature measurement in degrees Celsius relative to observation angle α (shown along solid line 370).

The graph 350, in this case, again shows distinct plateaus for the non-reference regions of the calibration wafer for both reflectance and temperature, shown in graph segments 380. However, once the melting point of the metal in the reference region of the calibration wafer is reached, and a eutectic is formed, the reflectivity of the reference region denotes a dramatic change in the particular embodiment shown, such that the distinct peak of FIG. 4A now becomes a distinct trough. In other embodiments, the peak may remain after melting but may then be smaller.

By using the reflectance measurements like those of FIG. 4A and FIG. 4B to determine when the eutectic melting transition occurs (when the reflectance of the reference region drops), a phenomenon that occurs at a known temperature, an accurate calibration value for the temperature in the non-reference region can be derived. This process is shown in more detail in the graph of FIG. 5.

Figure 5:
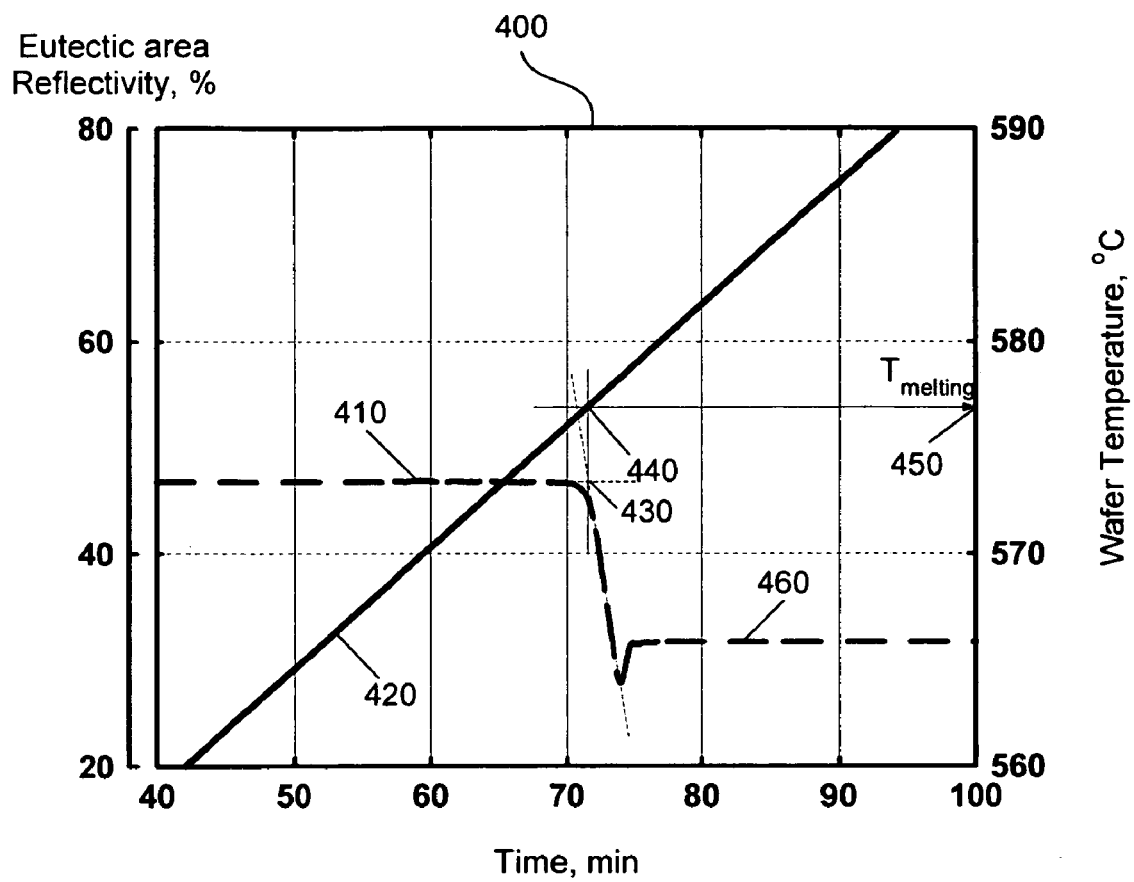
FIG. 5 is a graphical representation of one embodiment of final wafer temperature measurement calibration.

FIG. 5 shows a graphical representation of temperature calibration based in the reference region of the calibration target. Specifically, graph 400 is an overlay of (1) reflectivity measurement in percentage of light reflected from the reference region 135 relative to observation time (shown along broken line 410), and (2) temperature measurement in the non-reference region in degrees Celsius relative to the same observation time (shown along solid line 420).

As the actual temperature of the calibration target increases, the measured temperature in the non-reference region (line 420) also increases. When the actual temperature of the calibration target reaches the melting temperature of the metal in the reference region (the known eutectic temperature), the reflectivity drops suddenly. Thus, the actual temperature of the calibration target at this time is known; it is the known eutectic temperature.

The system thus provides a measured temperature and a known, actual temperature, so that the pyrometer can be calibrated. The reflectivity decrease does not occur instantaneously; the descending portion of line 410 (at about 72 minutes) has a finite slope. This can introduce some error into the system. However, the error is minimal for small heating rates. This error can be further minimized by taking the time at which the target reaches the melting temperature as the time coordinate of the intersection point 430 defined by the intersection between a straight-line approximation of the descending portion of the curve and a straight-line approximation of the flat portion (to the left in FIG. 5). This intersection point can be plotted graphically or, preferably, by equivalent, standard computational methods.

The calibration is particularly accurate because the measured temperature values used in calibration represent temperature measurements from the non-reference or second region 130 of the target. This region has a low reflectivity, and hence provides more accurate measured temperatures. Moreover, the target material in the non-reference region desirably has reflectivity similar to that of the material of the wafers to be processed in the system. Indeed, the target material may be the same material as the material of the wafers to be processed. Therefore, measured temperature values from the non-reference region closely correspond to values measured from the wafers to be processed. Thus, the calibration obtained using this system will provide good calibration for measurements of wafer temperature during production operations.

The calibration process can be integrated with actual production operations. If the materials of the calibration wafer are compatible with the chemical vapor deposition process or other process to be performed in the reactor, the calibration wafer can be loaded on the wafer carrier with real wafers to be processed, and the calibration can be obtained during actual production operations. This further increases the accuracy of the calibration data.

The foregoing steps provide calibration at only a single known temperature. Calibration data at additional known temperatures can be obtained by using two or more calibration wafers having metals, target materials or both of different compositions.

As best appreciated with reference to FIGS. 4A and 4B, the measured temperature in the reference region, and the relationship between the measured temperatures of reference and non-reference regions, also change abruptly when the metal in the reference region melts. Thus, measured temperature curve 320 (FIG. 4A), prior to melting, indicates that the measured temperature in the reference region (the peak at region 340 of the curve) is higher than the measured temperature in the non-reference region (the plateaus in regions 330). After melting (FIG. 4B) the measured temperature in the reference region is lower than the measured temperature in the non-reference region, as shown by the trough in curve 370 at region 390. Thus, a plot of measured temperature in the reference region versus time would show a gradual increase prior to melting, changing abruptly to a plateau or decrease when the target reaches melting temperature. Similarly, a plot of the difference in measured temperature between the reference and non-reference regions would show an approximately constant difference, followed by an abrupt decrease when the target reaches melting temperature. Of course, both before and after melting, the actual temperatures of the reference region and non-reference region are identical; the differences in measured temperatures arise from the fact that the measured temperatures are functions of reflectivity, as well as actual temperature.

However, because the measured temperature in the reference region, and the difference in measured temperatures between reference and non-reference regions are functions of reflectivity, the abrupt changes in either of these parameters can be used instead of the reflectivity data itself, to identify the time when the target reaches the melting temperature. For example, in a variant of the system discussed above, the optical system may include only a simple pyrometer with no reflectivity-measuring capability.

Figure 6A:
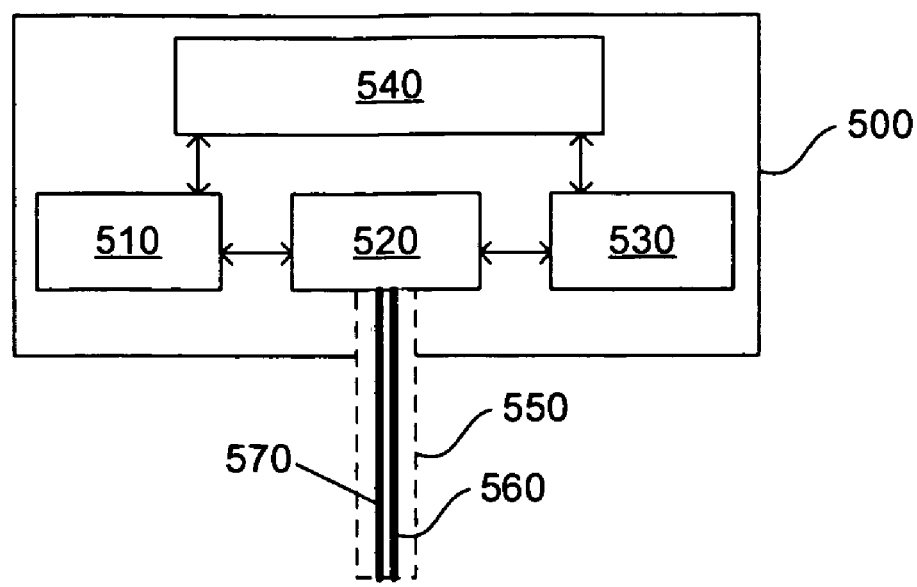
FIG. 6A is a partial block diagram of a pyrometry temperature calibration system according to a further embodiment of the present invention employing a plurality of pyrometers.

FIG. 6A shows one alternate embodiment of a pyrometry temperature calibration system of the present invention employing a plurality of pyrometers. In this case, an optical head 500 is provided with a first pyrometer 510 and a second pyrometer 530, both connected to an optical system 520 and a central processing unit 540 in a manner similar to that previously described. The optical system links to the CVD chamber (not shown) via an optical head light path 550 as previously descried, wherein temperature/emissivity data from the calibration wafer in the CVD chamber (as shown in FIG. 1) are obtained from the non-reference region of the calibration wafer along a light path 570 and transmitted via the optical system 520 to the first pyrometer 510 for determination of temperature measurements using the central processing unit 540.

In addition, temperature/emissivity (instead of reflectivity) data is obtained from the calibration wafer in the reference region via a light path 560, transmitted via the optical system 520 to the second pyrometer 530 (instead of a reflectometer). Instead of obtaining a reflectance measurement for the reference region and a temperature reading for the non-reference region, temperature measurements are obtained for both, and the analysis as shown in FIGS. 4A, 4B and 5 are performed as to two temperature lines rather than a temperature and a reflectance line.

Figure 6B:
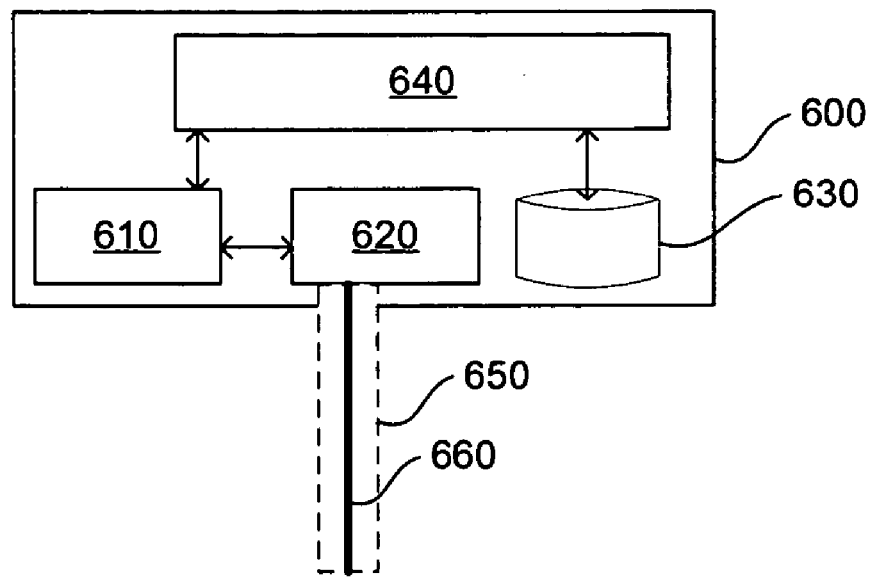
FIG. 6B is a block diagram of a further embodiment of a pyrometry temperature calibration system of the present invention.

FIG. 6B shows one embodiment of another alternative pyrometry temperature calibration system of the present invention, employing a pyrometer and a secondary source of reflectivity information. In this case, an optical head 600 is provided with a single pyrometer 610 and an optical system 620, connected to a central processing unit 640. The central processing unit 640 includes a database 630 of known reflectivity and/or temperature values for the melting point of the eutectic for the metal used in the reference region of the calibration wafer to be used for pyrometry calibration.

The optical system links to the CVD chamber (not shown) via an optical head light path 650 as previously described, wherein temperature/emissivity data from the calibration wafer in the CVD chamber (as shown in FIG. 1) are obtained from the reference region of the calibration wafer along a light path 660 and transmitted via the optical system 620 to the pyrometer 610 for determination of temperature measurements using the central processing unit 640. Upon melting of the eutectic in the reference region of the calibration region, the central processing unit 640 employs the database 630 of known reflectance, emissivity, and/or temperature information to correlate the melting point found by the pyrometer to the temperature at which melting is known to occur, and calibrates the pyrometer accordingly.

Figure 7:
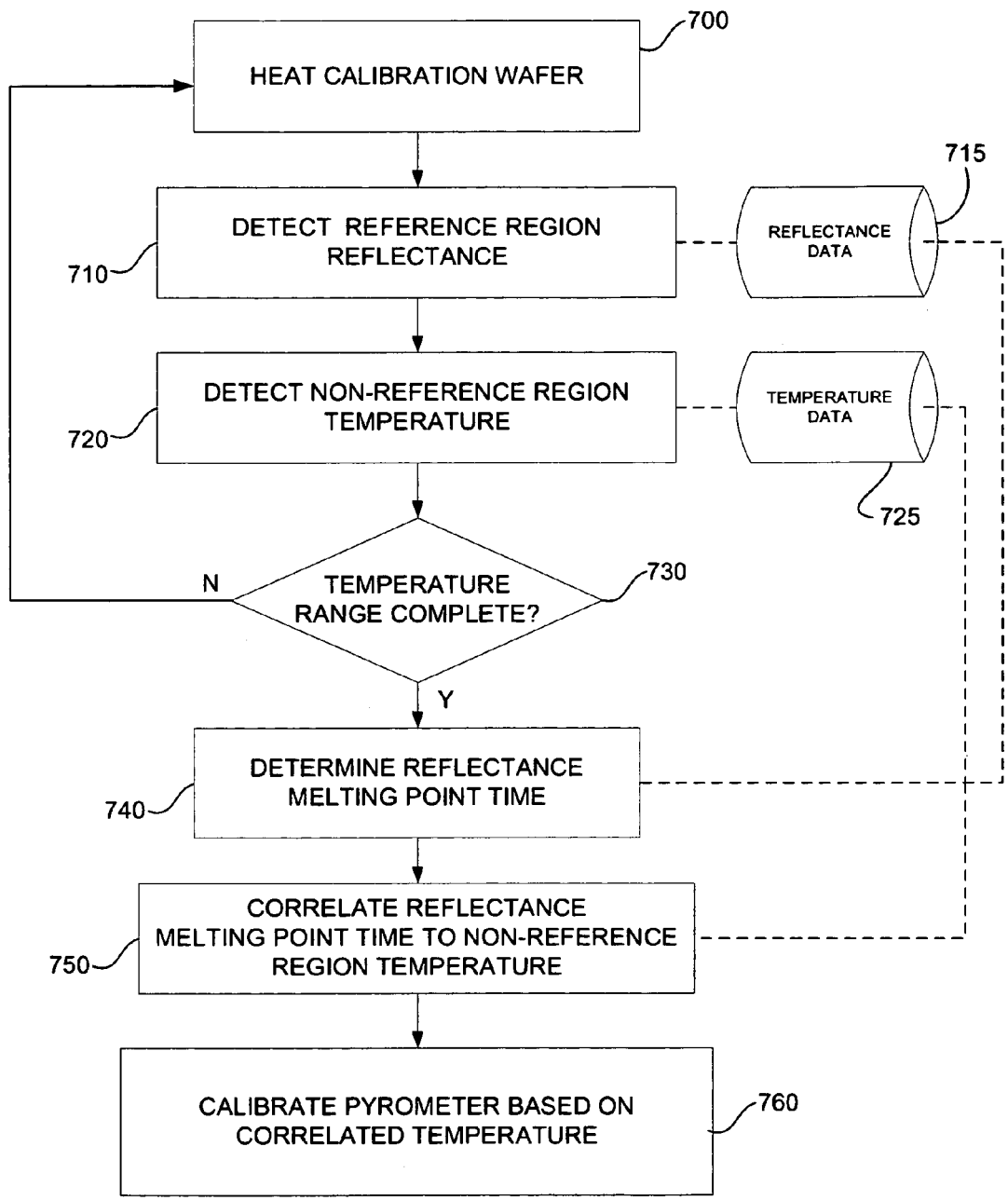
FIG. 7 is a flow chart depicting one embodiment of a method of calibrating a pyrometer temperature reading.

FIG. 7 shows one embodiment of a method of calibrating a pyrometer temperature reading according to one embodiment of the invention, in accordance with the embodiment of the pyrometer calibration system shown in FIG. 1 and the data line graphs shown in FIGS. 4A, 4B and 5. The calibration wafer 120, once placed in a wafer compartment 115 of a wafer carrier 110 placed in CVD reactor 100, where the calibration wafer rotates as it is heated.

Initially, the calibration wafer is heated in a calibration wafer heating step 700 and the detection process is started. A reflectance detection step 710 is performed for the reference region of the calibration wafer to obtain reflectance data 715 via light transmitted from the optical head, off of the metal in the reference region, and back into the optical system for reading, data storage, and analysis. The reflectance data is observed via a modulation circuit or software in the central processing unit, and the reflectance data 715 is processed and stored by the central processing unit 240 (see FIG. 1). During the same time period, a temperature detection step 720 is performed for the non-reference region of the calibration wafer to obtain temperature and/or emissivity data 725 via emitted radiation from the non-reference region of the calibration wafer received by the optical system and forwarded to the pyrometer for reading, data storage, and analysis. The temperature data 725 is similarly obtained from an unmodulated circuit signal obtained from a separation circuit or software in the central processing unit, and it is processed and stored by the central processing unit 240 (see FIG. 1).

The reflectance detection step 710 and temperature detection step 720 are performed continuously through a periodically repeating set of observation angles (observation angles $\alpha$ rotating at a rate $\beta$) and through range of temperatures over time to obtain a full set of data 715, 725 for the pyrometer and reflectometer for a particular calibration wafer and reaction chamber.

A temperature range decision step 730 is reached to determine whether full ranges of temperatures for data 715, 725 have been obtained. If not, the process returns to the calibration wafer heating step 700 and continues repeating detection steps 710 and 720. When the temperature range decision step 730 finds a full range of data 715, 725 have been obtained, the eutectic melting point is determined from reflectance data in a reflectance melting point determination step 740. Note that the temperature range decision step 730 may optionally be skipped or modified such that, for example, the detection steps 710 and 720 are continued until a determination at the reflectance melting point determination step 740 that enough data 715, 725 has been obtained to find the eutectic melting point from reflectance data.

Then, at the reflectance melting point determination step 740, the time point at which eutectic melting occurred is determined from the reference region reflectance data 715 obtained in the reflectance region detection step 710. The resulting time point is correlated to the temperature data 725 obtained from the non-reference region detection step 720 at a melting point correlation step 750 (see FIG. 5).

Finally, the correlated temperature from the melting point correlation step 750 is used to calibrate the pyrometer in a pyrometer calibration step 760 via communication between the central processing unit 240 and the pyrometer 210 or as otherwise performed for a particular pyrometer system employed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:
1. A method for calibrating a pyrometer, comprising:
placing a calibration target wafer in optical communication with an optical head via an optical head field of view, said calibration target including a first surface with a first eutectic-forming metal region at least partially surrounded by a second semiconductor region, said eutectic-forming metal having a known melting point when placed on said calibration target wafer, said optical head including a pyrometer, a source of reflectivity data, a processor, an emitter, and at least one photodetector in said optical head field of view;

heating said calibration target wafer;

moving said calibration target wafer relative to said optical head field of view via periodic motion, such that said optical head field of view regularly crosses said first eutectic-forming metal region and said second semiconductor region of said first surface of said calibration target wafer;

obtaining the known melting point of said eutectic region of said calibration target from said source of reflectivity data;

obtaining temperature data for said calibration target wafer in said second exposed semiconductor region from said pyrometer through said optical head field of view when said optical head field of view crosses said second semiconductor region; and, calibrating said pyrometer at said processor by correlating said reflectivity data and said temperature data to determine the actual temperature of said calibration target wafer when said melting point of aid eutectic region is reached, and adjusting the pyrometer based on said actual temperature.

2. The method of claim 1, wherein said source of reflectivity data is a reflectometer, and said reflectivity data is obtained from said eutectic-forming metal region through said optical head field of view when said optical head field of view crosses said eutectic-forming metal region.

3. The method of claim 1, wherein said source of reflectivity data is a second pyrometer, and said reflectivity data is obtained indirectly through second temperature data obtained from said second pyrometer when said optical head field of view crosses said eutectic-forming metal region.

4. The method of claim 1, wherein said source of reflectivity data is a database of predetermined reflectivity data.

5. The method of claim 1, further comprising the step of rotating said calibration target wafer relative to said optical head at a regular rate to obtain repeated measurements of reflectivity data when said optical head field of view crosses said eutectic-forming metal region and temperature data when said optical head field of view crosses said semiconductor region.

6. The method of claim 1, further comprising the steps of:
transmitting light from said optical head to said first surface of said calibration target wafer along said optical head field of view;

receiving reflected light at said optical head from said calibration target wafer along said optical head field of view;

separating modulated and unmodulated portions of said reflected light at said optical head; and, calculating temperature data at said pyrometer based on said modulated portion of said reflected light and calculating reflectivity data at said reflectometer based on said unmodulated portion of said reflected light.

7. The method of claim 1, wherein the calibration target wafer is formed of a material selected from the group of silicon, gallium arsenide and gallium nitride.

8. The method of claim 7, wherein the eutectic forming layer is formed of a metal selected from the group of aluminum and silver.

* * * * *

UNITED STATES PATENT AND TRADEMARK OFFICE
CERTIFICATE OF CORRECTION

PATENT NO. : 7,275,861 B2 Page 1 of 1
APPLICATION NO. : 11/046741
DATED : October 2, 2007
INVENTOR(S) : Boris Volf, Mikhail Belousov and Alexander I. Gurary It is certified that error appears in the above-identified patent and that said Letters Patent is hereby corrected as shown below:

Title Page;
On the face of the patent:
    (57) ABSTRACT, line 3, "is provided" should read -- are provided --.

Column 1, line 42, "temperature. By" should read -- temperature by --.
Column 2, line 61, "of aid" should read -- of said --.
Column 4, line 29, "more gases" should read -- more gas --.
Column 9, line 62, "110 placed" should read -- 110 is placed --.
Column 10, line 21, "through range" should read -- through a range --.
Column 11, line 24, "of aid" should read -- of said --.
Column 12, line 29, "eutectic forming" should read -- eutectic-forming --.

Signed and Sealed this

Nineteenth Day of August, 2008

JON W. DUDAS
*Director of the United States Patent and Trademark Office*